(12) United States Patent
Gobrogge et al.

(10) Patent No.: US 6,616,386 B2
(45) Date of Patent: Sep. 9, 2003

(54) FINGER COT HANDLING APPARATUS

(75) Inventors: Brian A. Gobrogge, Albany, GA (US); James R. Whitten, Albany, GA (US)

(73) Assignee: AGRI Dynamics, Inc., Albany, GA (US)

( * ) Notice: Subject to any disclaimer, the term of this patent is extended or adjusted under 35 U.S.C. 154(b) by 0 days.

(21) Appl. No.: 10/056,817

(22) Filed: Jan. 24, 2002

(65) Prior Publication Data

US 2003/0138300 A1 Jul. 24, 2003

(51) Int. Cl.⁷ .............................................. B65G 51/30
(52) U.S. Cl. .......................................... 406/176; 406/73
(58) Field of Search .............................. 406/73, 74, 76, 406/176, 177, 180

(56) References Cited

U.S. PATENT DOCUMENTS

| 3,083,813 A | | 4/1963 | Lusher | |
|---|---|---|---|---|
| 3,272,396 A | * | 9/1966 | Neville, Jr. | 222/636 |
| 3,992,766 A | | 11/1976 | Field | |
| RE30,410 E | | 10/1980 | Poviacs | |
| 5,014,407 A | | 5/1991 | Boughten et al. | |
| 5,499,898 A | | 3/1996 | Vonier et al. | |
| 5,564,552 A | | 10/1996 | Vonier et al. | |
| 6,484,902 B1 | * | 11/2002 | Rouse | 221/278 |
| 2003/0021639 A1 | * | 1/2003 | Whitten et al. | 406/198 |

* cited by examiner

*Primary Examiner*—Joseph A. Dillon
(74) *Attorney, Agent, or Firm*—Thomas C. Saitta (57) ABSTRACT

An apparatus for loading thin-walled, elastic, tubular members having a single closed end, such as finger cots, condoms, balloons or the like, onto elongated rod or finger elements for subsequent placement onto a mandrel for processing or testing, where the tubular member is drawn in inverted manner onto the finger elements by suction and where separable finger element alignment blocks are provided to properly align and position the finger elements to receive the tubular member.

25 Claims, 7 Drawing Sheets

FINGER COT HANDLING APPARATUS

BACKGROUND OF THE INVENTION

This invention relates generally to the field of equipment for handling finger cots or other thin-walled, elastic, tubular members having a single closed end, such as condoms or balloons, and more particularly relates to such equipment which is used to handle, orient, test or otherwise process individual cots. Even more particularly, the invention relates to such equipment which incorporates a set of multiple fingers or rods adapted to receive an individual cot for subsequent expansion and placement onto a mandrel for testing, printing or the like, and to such equipment which utilizes suction to bring the cots to the receiving fingers.

Tubular members such as finger cots, condoms, balloons and the like are formed of an elastic polymeric material and typically are relatively thin with a generally elongated body shape, such that the longitudinal axis length is greater than the cross-sectional diameter, where one end of the body is closed and the other end is open. Such members are difficult to handle in bulk because of the elasticity and friction characteristics inherent in the material of construction, the lack of structural rigidity, the relatively small size, the ease of rupture if mishandled, and other factors. It is desirable in many circumstances, and sometimes required, that individual members be handled, processed or treated in some manner. For example, finger cots and condoms must be tested for holes and imperfections by stretching each condom onto a testing mandrel. Balloons may need to be individually imprinted with designs or lettering.

Apparatuses have been developed for handling finger cots and the like, and one type of such apparatus uses suction to transport and orient individual tubular members through conduits, where the tubular members are retrieved in random orientation from a hopper but delivered in a uniform predetermined orientation. Where the tubular members must be placed onto mandrels for testing or further processing, some of this type of handling equipment utilize a set of slender, elongated fingers or rod elements which are initially disposed in a generally parallel and abutting fashion to pass upwardly into the open end of the tubular element, such that the closed end of the tubular member rests on the tops of the finger elements with the body of the tubular member hanging down and encircling the finger elements. The mandrel is brought into the center of the finger elements, or the finger elements are brought down over the mandrel, such that the mandrel radially expands the finger elements and the tubular member and relative axial movement of the mandrel and finger elements causes the tubular member to be deposited onto the mandrel with the finger elements withdrawn. The finger elements act as runners to reduce friction between the mandrel and the tubular member during the loading process so that the entire tubular member will be disposed onto the mandrel in a fully extended manner. Such apparatuses having finger elements to receive the tubular members are shown for example in U.S. Pat. Nos. 5,499,898 and 5,564,552 to Vonier et al., the disclosures of which are incorporated herein by reference. These patents disclose a condom handling apparatus where the individual condoms are dropped onto the finger elements, with the carriage or mount holding the finger elements being passed over the mandrel axially in order to place the condom onto the mandrel.

In order to maximize the efficiency of the finger elements in receiving and expanding the tubular member, it is known to provide individual finger elements with differing physical structures or configurations. For example, in a set of finger elements mounted onto a carriage, one or more finger elements may be of different lengths, or one or more finger elements may be non-linear, having angled segments or curved segments. Because the tubular elements being disposed onto the finger elements have relatively small inner diameters, and because the tubular elements are composed of highly flexible material which may not retain a circular cross-sectional configuration during handling, it is imperative that the cross-sectional area occupied by the bundle of finger elements be minimized when in the abutted condition for receiving the tubular member, so that all of the finger elements will be disposed within the tubular member when it is placed onto finger elements. This is especially true when handling finger cots, which may have an inner diameter of only about five eighths of an inch. After hundreds and thousands of repetitions where the finger elements are radially expanded and then contracted, the finger elements may become misaligned, causing an increasing numbers of misfeeds, which may eventually require repair or replacement of the finger elements. Furthermore, finger cots are relatively short as well, being typically about two and three quarter inches in length. This causes problems with equipment utilizing the gravity or "parachute" method of depositing the tubular member onto the finger elements, where the tubular member is oriented with the open end downward and then dropped onto the finger elements, with air pressure alone acting to expand the tubular member as it falls, in that the margin of error is reduced for the smaller tubular members and any misalignment or reduced pressure expansion during the drop may result in a misfeed.

It is an object of this invention to provide improved tubular member handling apparatuses, and in particular improved finger cot handling apparatuses, where the problems of maintaining concise bundling and alignment of the finger elements and of inadequacies associated with the gravity drop method of disposition of the tubular member onto the finger elements are obviated. It is an object to address these problems in apparatuses employing sets of finger elements to receive the individual tubular members by providing a finger element alignment mechanism which properly aligns and orients the individual finger elements in the bundled or contracted configuration. It is a further object to provide a more controlled method for disposing the tubular members onto the finger elements relative to the gravity drop method, by providing a vacuum mechanism such that the closed end of the tubular member is delivered first to the tips of the finger elements and where the vacuum subsequently inverts the tubular member and draws the open end and body of the tubular member onto the finger elements. It is a further object to provide an apparatus where the finger element alignment mechanism also acts as a sealing gate to provide a closed chamber about the finger elements such that a pressure differential may be created within the closed chamber to pull the tubular member onto the finger elements, the finger element alignment mechanism opening to allow removal of the finger elements and tubular member from the chamber after the tubular member is properly disposed onto the tubular members. These and other intended objects not expressly stated above will be made apparent by the disclosure to follow.

SUMMARY OF THE INVENTION

The invention is in general an apparatus and method for disposing thin-walled, elastic, tubular members having one closed end and one open end, such as a finger cot, condom, balloon or the like, onto a set of plural, radially expandable, finger or rod elements mounted onto a carriage assembly, with the finger elements extended upward within the tubular element such that the closed end of the tubular element rests on the tips of the finger elements. The invention comprises in general a vacuum chamber adjoined to tubular member delivery means, where an individual tubular member is drawn into the vacuum chamber closed end first by vacuum means. The finger elements extend into the vacuum chamber through an extraction port and are positioned such that the closed end of the tubular member strikes the tips of the finger elements when it is drawn into the chamber. The vacuum causes the tubular member to invert, such that the body and open end of the tubular member are pulled onto the main bodies of the finger elements.

A finger element alignment means is provided, the alignment means temporarily constraining, orienting and aligning the finger elements such that they are tightly bundled into a small cross-sectional area prior to receipt of the tubular member. The alignment means further acts to temporarily seal the extraction port so that a suction can be created by the vacuum means to draw the tubular member into the vacuum chamber. The alignment means preferably comprises a pair of laterally movable blocks, each having a semi-circular finger element control bore, such that advancing the blocks toward each other produces a fully circular control bore of small diameter to properly align the finger elements, while the blocks themselves combine to seal the extraction port in the vacuum chamber so that suction may be drawn within the vacuum chamber.

The operation sequence for one embodiment comprises advancing the finger elements through the extraction port and into the vacuum chamber, advancing together the finger element alignment means to align the finger elements and seal the extraction port, opening a vacuum gate such that the vacuum means creates negative pressure within the vacuum chamber, thereby drawing a tubular element into the vacuum chamber from tubular element delivery means, with the negative pressure causing the tubular member to invert over and onto finger elements, closing the vacuum gate and retracting the alignment means to open the extraction port, and withdrawing the finger elements and tubular member, with the cycle repeating. In an alternative embodiment, the operation sequence differs in that the finger alignment means are advanced together prior to advancing the finger elements through the extraction port, such that the combination of the finger element alignment means produces a guide bore to direct the finger elements as they are advanced through the extraction port and into the vacuum chamber.

DETAILED DESCRIPTION OF THE INVENTION

With reference to the drawings, the invention will now be described in detail with regard for the best mode and the preferred embodiments. In general, the invention is an apparatus, which will typically be a component within a more extensive apparatus or system, for handling thin-walled, elastic, tubular members having a single closed end, such as finger cots, condoms, balloons or the like, and more particularly is an apparatus for disposing the tubular members onto elongated rod or finger elements for subsequent placement onto a mandrel for processing or testing, where the tubular member is drawn in inverted manner onto the finger elements by suction and where finger element alignment means are provided to properly align and position the finger elements to receive the tubular member.

As used herein, the term tubular member shall be taken to mean a thin-walled, elastic, generally elongated member, such that the longitudinal axis length is greater than the cross-sectional diameter, having a single closed end and an open end, such as a finger cot, condom, balloon or the like. Apparatuses or systems for handling individual tubular members are known, and may include a finger element assembly 100 comprising a plural number of finger elements 101 mounted on a carriage member 102, such as more fully described in U.S. Pat. Nos. 5,499,898 and 5,564,552 to Vonier et al., the disclosures of which are incorporated herein by reference. The individual finger elements 101 comprise a tip 103, a main body segment 104 and a shoulder 105. The main body segments 104 are positioned in generally parallel alignment and may be of identical or differing lengths. The shoulders 105 provide an open area adjacent the carriage member 102 for contacting an appropriately shaped mandrel onto which the tubular members 110 are stretched for subsequent processing or testing, the finger elements 101 being pivotally mounted onto the carriage member 102 such that they are be expanded outwardly in the radial direction perpendicular to the longitudinal axis as the mandrel is passed through carriage member 102 or as the carriage member 102 is drawn onto the mandrel. The finger elements 101 act both as retainers to temporarily hold the tubular member 110 and as runners to assist movement in the axial direction during loading by reducing friction. During initial disposition or loading of the tubular member 110 onto the finger elements 101, the main body segments 112 and the tips 103 are preferably abutted, aligned and disposed in the smallest possible cross-sectional area, centrally located within the area for receiving the tubular member 110, such that the plural finger elements 101 present in effect a unified member onto which the tubular member 110 is disposed, thereby increasing the likelihood of attaining a proper placement of the tubular member 110 onto the finger elements 101.

As seen in FIGS. 1 through 3 and 4 through 6, the apparatus of the invention comprises or is used in conjunction with tubular member delivery means 10 for delivering individual tubular members 110, which will include orientation means for orienting the tubular members 110 such that all tubular members 110 will pass from delivery conduit 11 oriented with the closed end 111 as the forward end and with the open end 113 as the rear end. Various tubular delivery means 10 capable of this function are known in the art. The delivery conduit 11 communicates with and is joined to a suction tube or chute 21, the suction chute 21 preferably having a larger interior diameter than that of the delivery conduit 11 to allow for full expansion of the tubular member and to provide room for the inversion to occur. Suction apertures 22 are provided at the base of the suction chute 21 such that negative pressure can be created in the suction chute 21 by vacuum means 30. Preferably suction apertures 22 are equally spaced about the full circumference of the suction chute 21. The base of the suction chute 21 is open to receive the finger elements 101.

The suction chute 21 is retained within or formed as part of a housing block 40, which may be structured as a multi-part unit comprising for example an upper block 41 and a lower block or track elements 42 for ease of manufacture and assembly. The housing block 40 defines a suction port 43 for communication with the vacuum pump 31, a suction chamber 44 surrounding the suction apertures 22 of the suction chute, and an extraction opening 45 through which the finger elements 101 are inserted and removed. The suction chute 21 is preferably generally vertically oriented during use.

Vacuum means 30 for creating a suction to draw the tubular member 110 into the suction chute 21 comprises as shown a vacuum pump 31, a gate member 32 to open and close a suction passageway 33 communicating with the suction chamber 44, and gate actuation means 34, such as a pneumatic or hydraulic cylinder for example, for operating the gate member 32. Alternative known systems for intermittently providing a suction within the suction chute 21 or for actuating the gate member 32 may also be employed.

Figure 1:
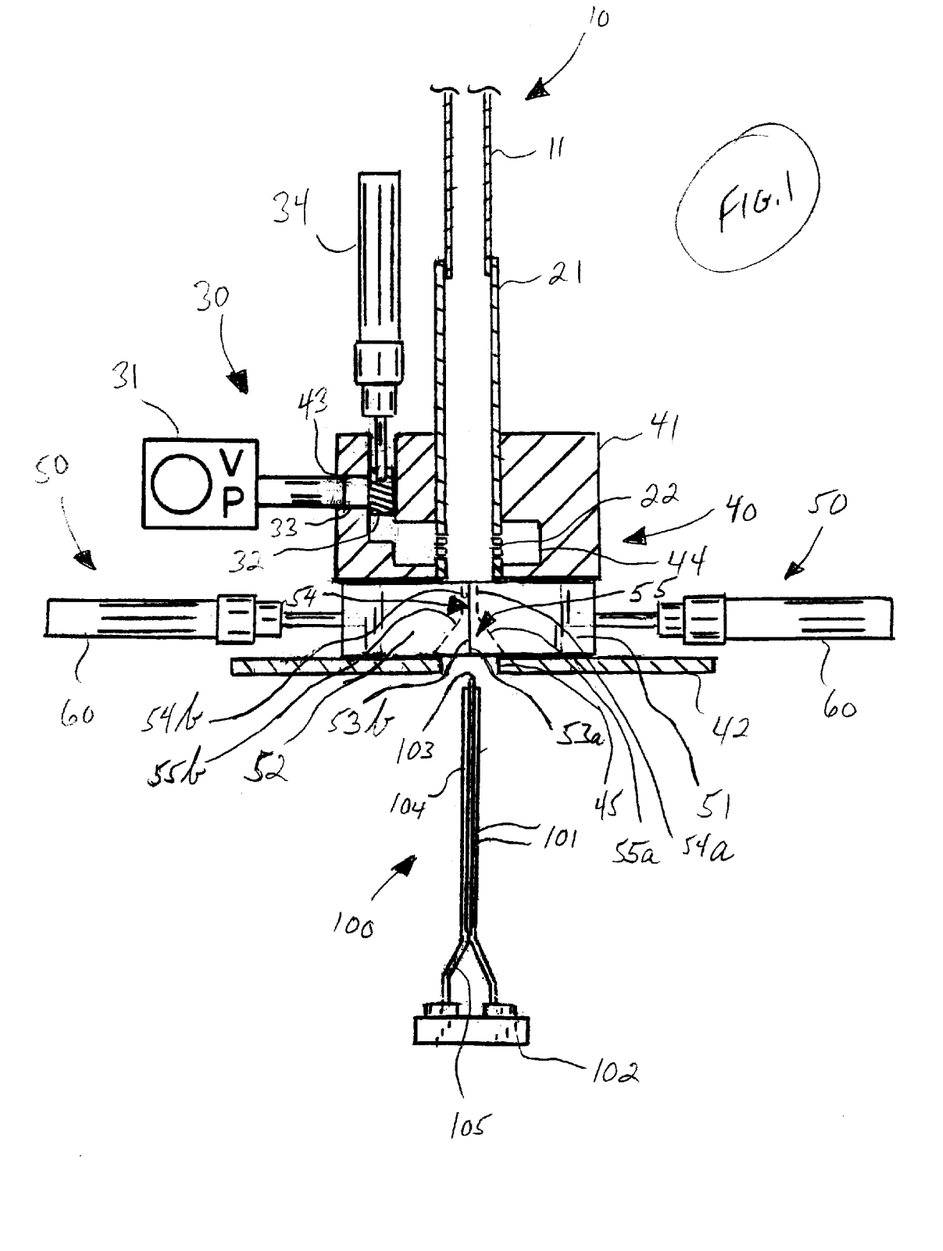
FIG. 1 is a view, shown partially in cross-section, showing the invention in the initial state for receiving the tubular member.
Figure 2:
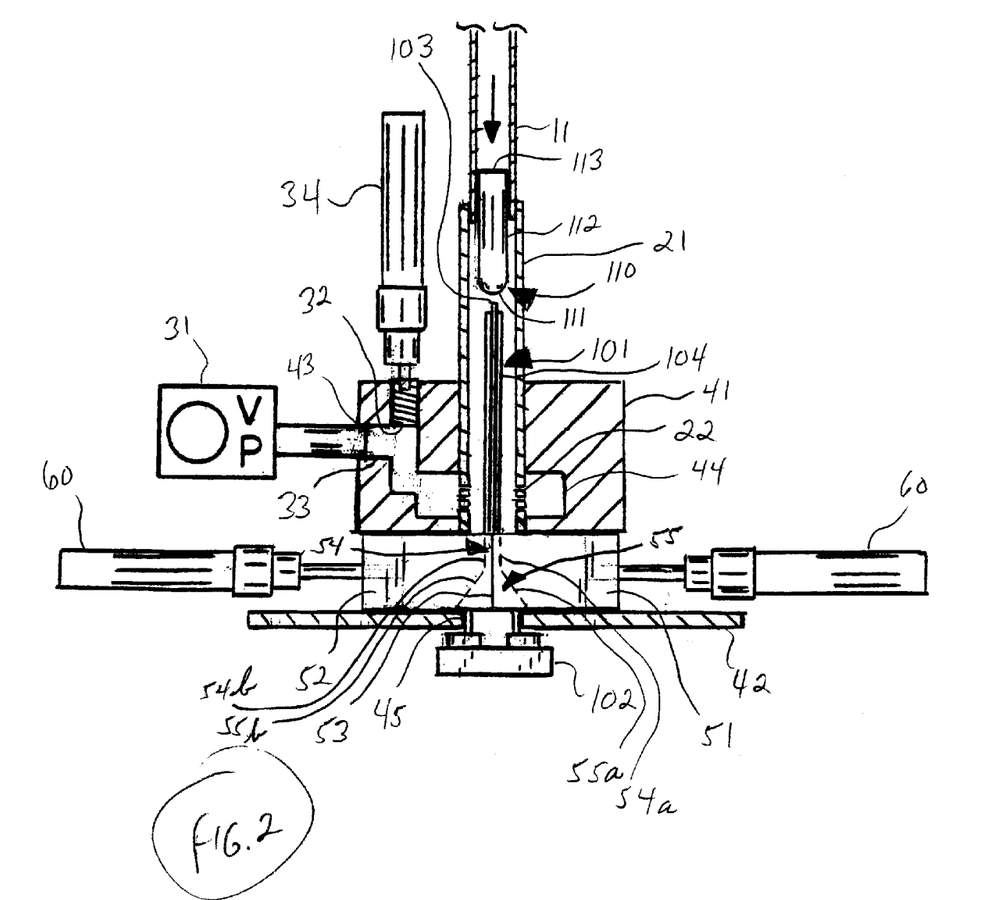
FIG. 2 is a view, shown partially in cross-section, showing the tubular member being drawn through the delivery conduit, the suction gate being in the open operative position and the finger element alignment means being in the closed position.
Figure 3:
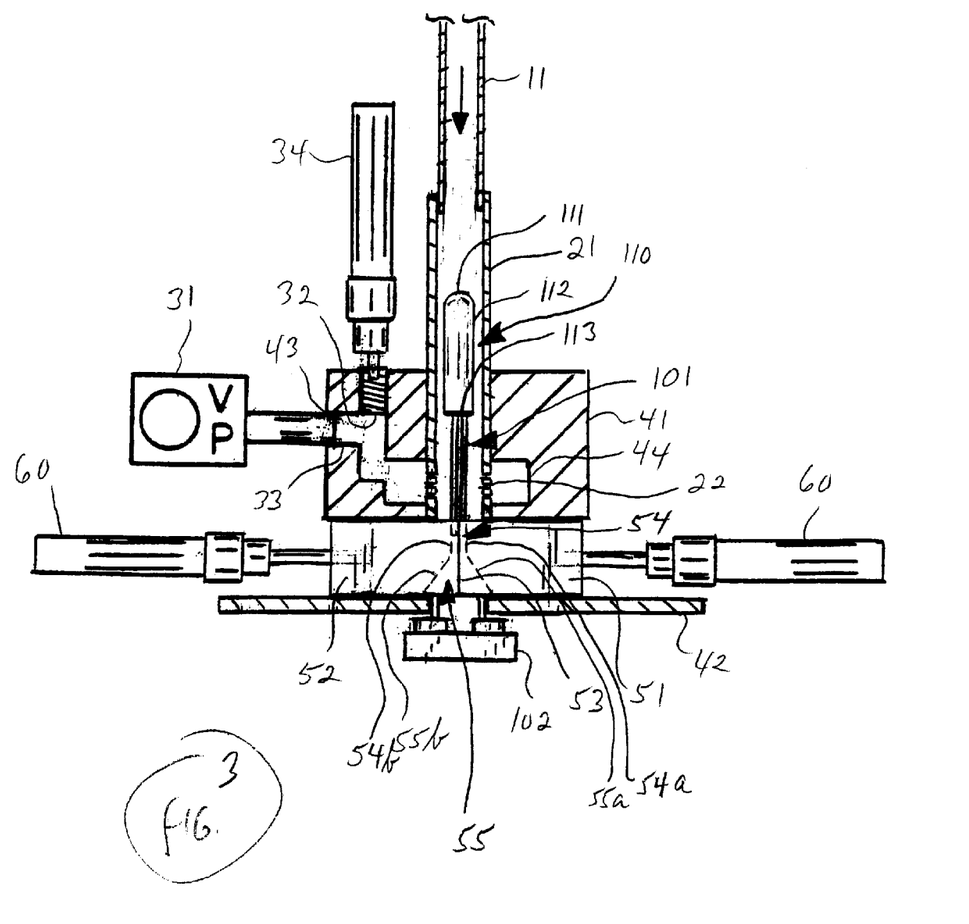
FIG. 3 is a view, shown partially in cross-section, showing the tubular member disposed in the inverted position on the finger elements.
Figures 7, 8, 9, 10:
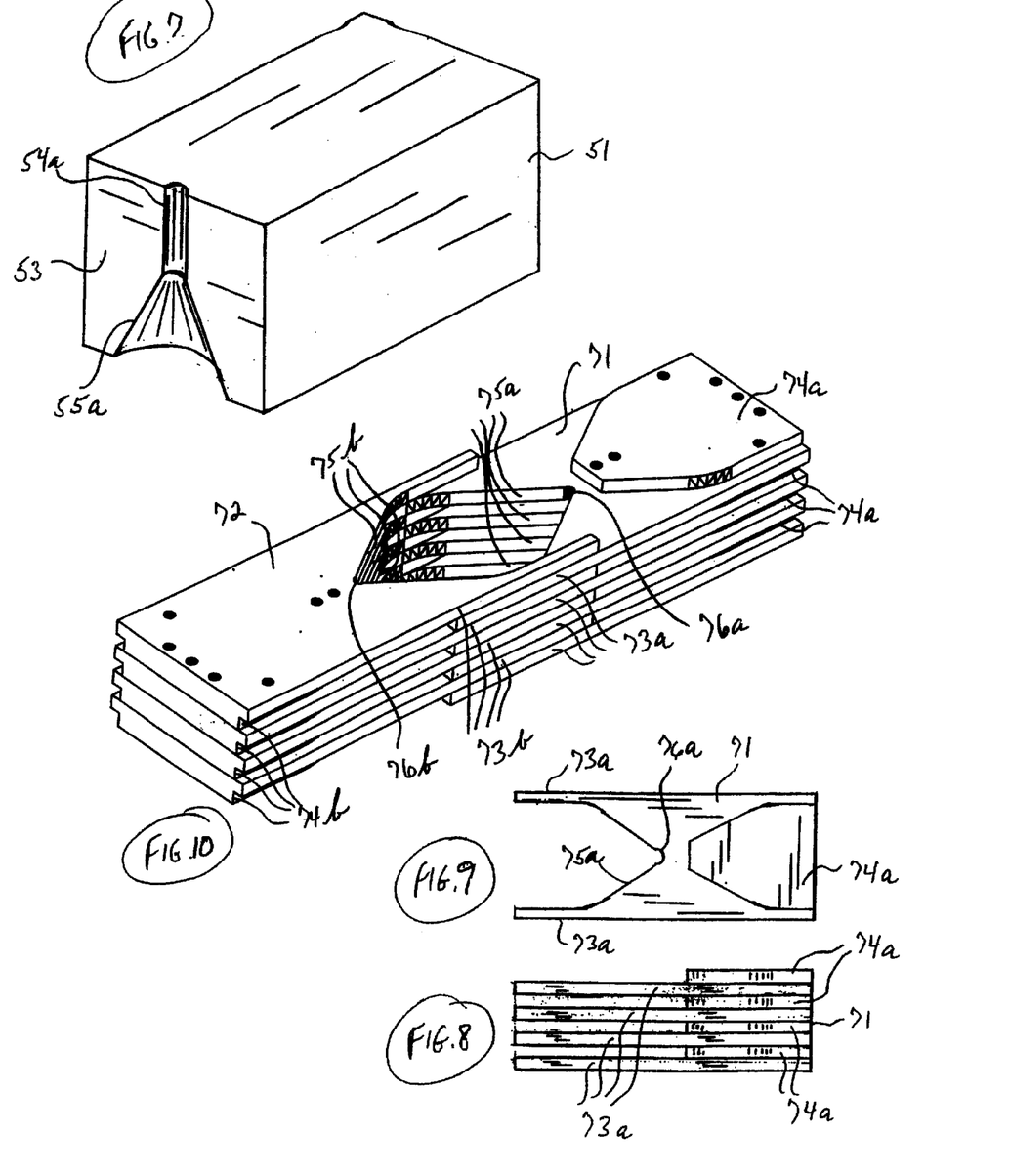
FIG. 7 is a perspective view showing one of the sliding blocks comprising the finger element alignment means.
FIG. 8 is a side view showing one of the sliding blocks of the alternative embodiment comprising the finger element alignment means.
FIG. 9 is a top view showing one of the sliding blocks of the alternative embodiment comprising the finger element alignment means.
FIG. 10 is a perspective view showing the sliding blocks of the alternative embodiment in the open position.

Finger element alignment means 50, which also most preferably serve as extraction port sealing means, are disposed below the suction chute 21 within housing block 40. The finger element alignment means 50 serve to properly retain, orient, abut and align relative to suction chute 21 the main body segments 104 and tips 103 of the finger elements 101 into a small cross-sectional or transverse area, with the main body segments 104 coaxially disposed with the central axis of the suction chute 21. The finger alignment means 50 are shown in the embodiment of FIGS. 1 through 3 to comprise a first sliding block 51 and a second sliding block 52, which are oppositely disposed within housing block 40. The sliding blocks 51 and 52 are operated by block actuating means 60 which serve to advance and retract the blocks 51 and 52 toward the finger elements 101 and toward each other such that faces 53a and 53b abut. Block actuating means 60 may comprise a pair of pneumatic or hydraulic cylinders as shown, or may comprise any other suitable known means for actuating the sliding blocks 51 and 52 as described. Disposed within the faces 53a and 53b of sliding blocks 51 and 52 is a semi-circular in lateral cross-section partial finger element control bore 54a and 54b and a partial shoulder guide bore 55a and 55b, as seen in FIG. 7, which when the sliding blocks 51 and 52 are abutted define a tubular finger element control bore 54 and a shoulder guide bore 55. The shoulder guide bore 55 provides a recess such that the shoulders 105 of the finger elements 101 are not contacted by the sliding blocks 51 and 52 when in the advanced position, as seen in FIGS. 2 and 3, and as shown is preferably provided in the form of a cone in order to also guide the finger elements 101 into the finger element control bore 54 when the sliding blocks 51 and 52 are abutted to create a full cone configuration in combination. The finger element control bore 54 is sized so as to contact and restrict a portion of the main body segments 104 of the finger elements, such that with the sliding blocks 51 and 52 in the advanced position, the combination of the two semi-circular finger element control bores 54a and 54b together define a tubular bore 54 which properly aligns and controls the finger elements 101. In addition to aligning the finger elements 101, the sliding blocks 51 and 52 define a gate mechanism which effectively seals the extraction opening 45 in housing block 40, such that the vacuum means 30 draws air almost exclusively through the suction chute 21 and delivery conduit 11. With the sliding blocks 51 and 52 in the retracted or separated position to form a large opening, the finger elements 101 retaining a tubular member 110 can be withdrawn from the extraction port 45 and suction chute 21 after loading.

A preferred methodology in utilizing the invention is demonstrated progressively in FIGS. 1 through 3. As shown in FIG. 1, the sliding blocks 51 and 52 are first advanced together such that they combine to seal the extraction port 45 except for the tubular bore 54 created by the abutting partial finger element control bores 54a and 54b. At this time the suction passageway 33 is closed by gate member 32 so that no suction is present in the suction chute 21. The finger elements 101 are then advanced through the funnel-shaped area defined by the combined shoulder guide bores 55a and 55b to be directed through the combined finger element control bores 54a and 54b. The finger element assembly 100 is now positioned as shown in FIG. 2 in the receiving position with the finger elements 101 having been fully inserted through the advanced and abutted sliding blocks 51 and 52, extraction port 45 and into the suction chute 21, such that the finger element tips 103 are uppermost. The shoulder guide bore 55 now surrounds the finger element shoulders 105 and the finger element control bore 54 now surround and properly align the finger elements 101. The presence of the finger elements 101 in the tubular bore 54 defined by the finger element control bores 54a and 54b, in combination with the main bodies of sliding blocks 51 and 52, effectively seals the extraction port 45 to allow a suction to be drawn in the suction chamber 44. Alternatively, it would also be possible to first advance the finger element alignment means 50 to insert the finger elements 101 into the suction chamber 44 prior to advancing the sliding blocks 51 and 52 to seal the extraction port 45 and align the finger elements 101, but this method loses the beneficial guiding effects of the funnel-shaped area formed by the combined shoulder guide bores 55a and 55b.

To draw a tubular member 110 into the suction chute 21, as shown in FIG. 2, the gate member 32 is now actuated to open the suction passageway, such that a suction is now drawn through the suction chute 21 and the delivery conduit 11, which pulls a tubular member 110 through the delivery conduit 11 and into the suction chute 21. The tubular member 110 is drawn in with the closed end 111 to the front, such that the closed end 111 strikes the finger element tips 103. Because of the suction from vacuum means 30, the main body 112 and the open end 113 of the tubular member 110 is drawn over the tips 103 and inverted, such that the main body 112 is disposed on the upper portions of the main body segments 104 of the finger elements 101 with the tubular member open end 113 being lowermost, the finger element tips 103 retaining the tubular member closed end 111, as shown in FIG. 3. The gate member 32 is then reversed to close the suction passageway 33 so that there is no longer any negative pressure in the suction chute 21. The sliding blocks 51 and 52 are then retracted by the block actuation means 60 to open the extraction opening 45, and the finger element assembly means 50 with the tubular member 110 disposed on the finger elements 101 is withdrawn from the housing block 40 for subsequent transfer of the tubular member 110 onto a mandrel. The cycle is then repeated for successive tubular members 110.

Figure 4:
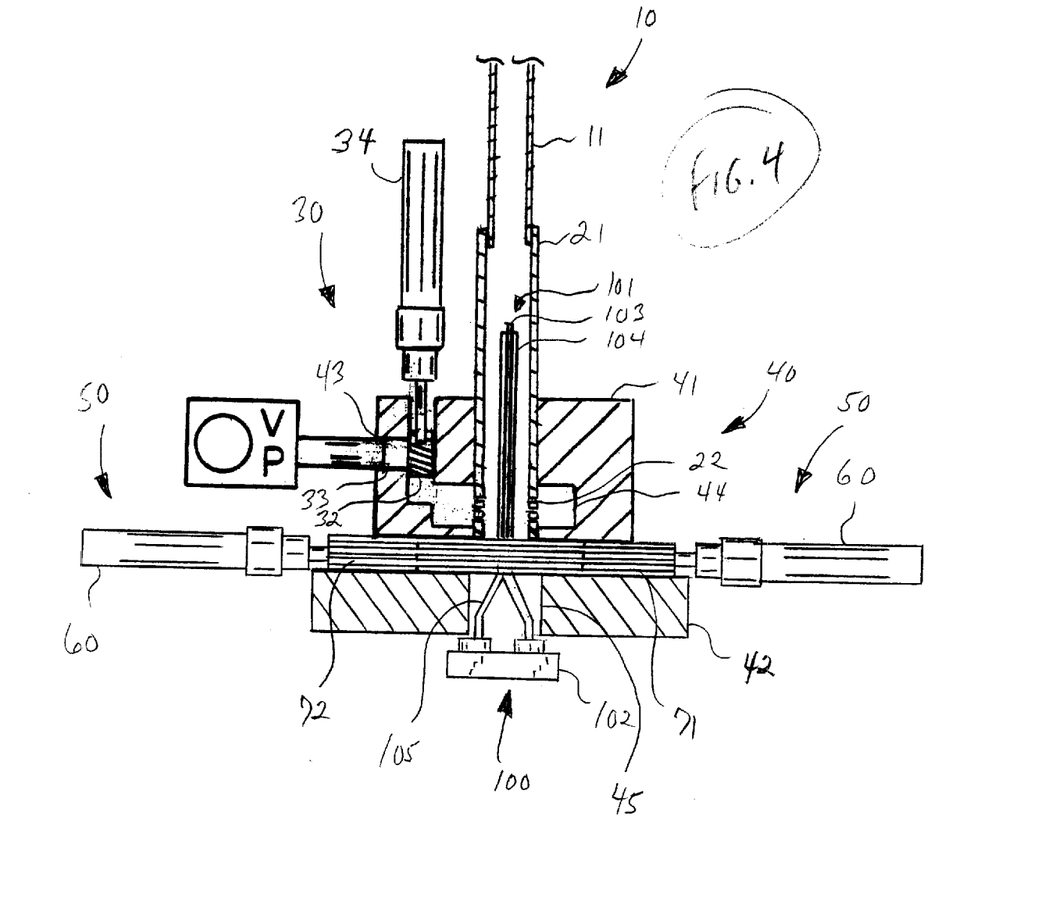
FIG. 4 is a view similar to FIG. 1 showing an alternative embodiment for the finger element alignment means.
Figure 5:
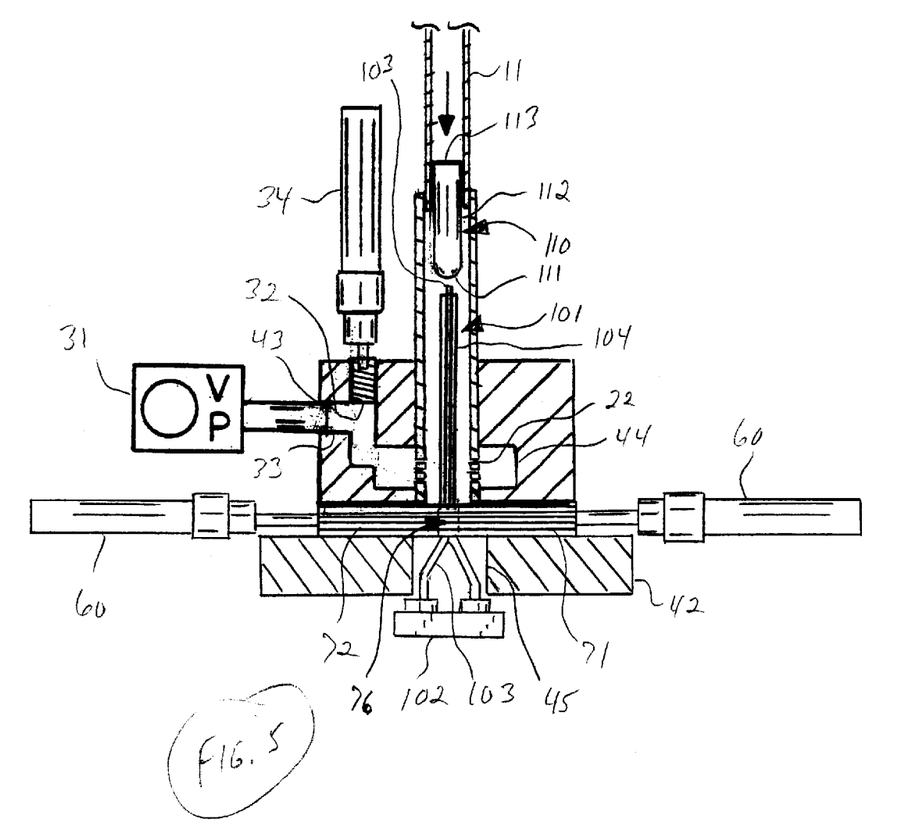
FIG. 5 is a view similar to FIG. 2 showing the alternative embodiment for the finger element alignment means, showing the tubular member being drawn through the delivery conduit, the suction gate being in the open operative position and the finger element alignment means being in the closed position.
Figure 6:
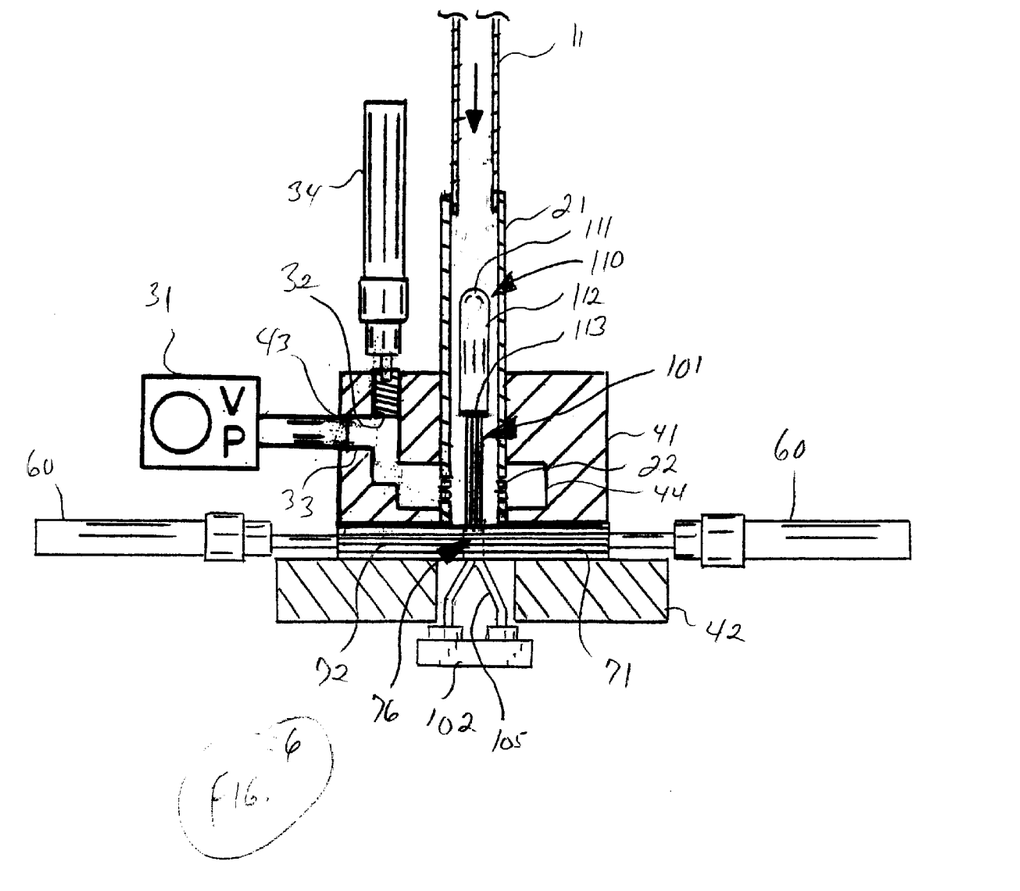
FIG. 6 is a view similar to FIG. 3 showing the alternative embodiment for the finger element alignment means, showing the tubular member disposed in the inverted position on the finger elements.

An alternative embodiment for the sliding blocks of the finger element alignment means 50 is shown in FIGS. 8 through 10 and 4 through 6. In this embodiment first and second sliding blocks 71 and 72 comprise layered or spaced interlocking guide members 73a and 73b separated by spacer elements 74a and 74b. The guide members 73a or 73b define a generally V-shaped partial access opening 75a or 75b terminating toward the interior in a semi-circular in lateral cross-section partial control bore 76a or 76b. The guide members 73a of sliding block 71 are disposed so as to abut and alternate vertically with the guide members 73b of sliding block 72 in an interlacing manner, with the partial access openings 75a and 75b facing each other, such that the two sliding blocks 71 and 72 may be advanced together, as shown in FIG. 10 and 6, such that the access opening 75 defined by the combination of partial access openings 75a and 75b is first reduced and then eliminated, with the two semi-circular partial control bores 76a and 76b meeting to define a generally tubular control bore 76 to encircle and align the finger elements 101. The spacer elements 74a and 74b are shaped and are of reduced dimension so as to not interfere with each other as the sliding blocks 71 and 72 are advanced together. The sliding blocks 71 and 72 are positioned within housing 40 such that they close onto the main body segments 104 of the finger elements 101 above the shoulders 105. The operation of the apparatus with this alternative embodiment is shown in FIGS. 4 through 6 and is generally the same as described above with reference to FIGS. 1 through 3, with sliding blocks 71 and 72 cooperating to align the finger elements 101 and to seal the extraction opening 45 when in the advanced state, with the exception that the finger elements 101 are first fully advanced into the suction chute 21 with the sliding blocks 71 and 72 separated in the retracted position as shown in FIG. 4. The sliding blocks 71 and 72 are then advanced to the abutting position to properly align the finger elements 101, and the operation continues as previously described with regard for capturing the tubular member 110 on the finger elements 101.

It is understood and contemplated that equivalents and substitutions for certain elements described above may be obvious to those skilled in the art, and thus the true scope and definition of the invention is to be as set forth in the following claims.

We claim:

1. In an apparatus for loading a thin-walled, elastic, tubular member having one closed end and one open end onto finger elements, the improvement comprising:
    vacuum means to draw the tubular member onto the finger elements;
    a housing block defining a suction chamber which receives said finger elements and into which said vacuum means draws said tubular member; and
    co-acting finger element alignment means to align said finger elements.

2. The apparatus of claim 1, wherein said finger alignment means comprises:
    a first sliding block having a face containing a partial finger element control bore and a second sliding block having a face containing a partial finger element control bore; and further comprising:
        block actuation means to abut said first sliding block face and said second sliding block face such that said partial finger element control bores define in combination a finger element control bore to retain and align said finger elements.

3. The apparatus of claim 2, wherein each said partial finger element control bore is semi-circular in cross-section such that said finger element control bore is tubular.

4. The apparatus of claim 2, wherein said first sliding block face further comprises a partial shoulder guide bore and said second sliding block face further comprises a partial shoulder guide bore, such that said partial shoulder guide bores define in combination a shoulder guide bore when said first sliding block face and said second sliding block face abut, said shoulder guide bore adapted to guide said finger elements into said finger element control bore.

5. The apparatus of claim 1, wherein said finger element alignment means comprises a tubular bore.

6. The apparatus of claim 5, where said finger element alignment means further comprises a conical shoulder guide bore.

7. The apparatus of claim 1, said finger element alignment means comprising:
    a first sliding block comprising a partial finger element control bore and layered interlocking guide members and spacer elements separating said interlocking guide members, said first sliding block guide members defining a generally V-shaped partial access opening and
    a second sliding block comprising a partial finger element control bore and layered interlocking guide members and spacer elements separating said interlocking guide members, said second sliding block guide members defining a generally V-shaped partial access opening;
    wherein said first sliding block interlocking guide members and said second sliding block interlocking guide members are disposed in alternating, interlaced manner with said partial access openings facing each other to define an access opening; and further comprising:
        block actuation means to advance together said first sliding block and said second sliding block such that said access opening is eliminated and said partial finger element control bores define in combination a finger element control bore adapted to retain and align said finger elements.

8. The apparatus of claim 7, wherein each said partial finger element control bore is semi-circular in cross-section such that said finger element control bore is tubular.

9. The apparatus of claim 1, wherein said finger element alignment means further seal said housing block.

10. The apparatus of claim 2, wherein said finger element alignment means further seal said housing block.

11. The apparatus of claim 7, wherein said finger element alignment means further seal said housing block.

12. The apparatus of claim 1, further comprising an extraction opening through which said finger elements are removed and inserted, and which is sealed by said finger element alignment means.

13. The apparatus of claim 1, said vacuum means further comprising a suction passageway and a gate member disposed within said suction passageway, wherein said gate member controls suction within said suction chamber.

14. An apparatus for loading a thin-walled, elastic, tubular member having one closed end and one open end onto rod-like finger elements, the apparatus comprising:
   finger elements adapted to receive thereon a thin-walled, elastic, tubular member having one closed end and one open end;
   a suction chamber which receives said finger elements;
   vacuum means to draw the tubular member into said suction chamber and onto said finger elements;
   movable finger element alignment means to align said finger elements.

15. The apparatus of claim 14, wherein said finger alignment means comprises:
   a first sliding block comprising a face and a partial finger element control bore and a second sliding block comprising a face and a partial finger element control bore; and further comprising:
      block actuation means to move said first and second sliding blocks such that said first sliding block face and said second sliding block face abut, such that said partial finger element control bores define in combination a finger element control bore retaining said finger elements to align said finger elements.

16. The apparatus of claim 15, wherein each said partial finger element control bore is semi-circular in cross-section such that said finger element control bore is tubular.

17. The apparatus of claim 15, wherein said first sliding block face further comprises a partial shoulder guide bore and said second sliding block face further comprises a partial shoulder guide bore, such that said partial shoulder guide bores define in combination a shoulder guide bore when said first sliding block face and said second sliding block face abut, said shoulder guide bore guiding said finger elements into said finger element control bore.

18. The apparatus of claim 17, wherein said shoulder guide bore is conical.

19. The apparatus of claim 14, said finger element alignment means comprising:
   a first sliding block comprising a partial finger element control bore and spaced interlocking guide members and spacer elements separating said interlocking guide members, said first sliding block guide members defining a generally V-shaped partial access opening;
   a second sliding block comprising a partial finger element control bore and spaced interlocking guide members and spacer elements separating said interlocking guide members, said second sliding block guide members defining a generally V-shaped partial access opening;
   wherein said first sliding block interlocking guide members and said second sliding block interlocking guide members are disposed in alternating, interlaced manner with said partial access openings facing each other to define an access opening; and further comprising:
      block actuation means to advance together said first sliding block and said second sliding block such that said access opening is eliminated and said partial finger element control bores define in combination a finger element control bore adapted to retain and align said finger elements.

20. The apparatus of claim 19, wherein each said partial finger element control bore is semi-circular in cross-section such that said finger element control bore is tubular.

21. The apparatus of claim 14, wherein said finger element alignment means further seal said suction chamber.

22. The apparatus of claim 14, further comprising an extraction opening through which said finger elements are removed and inserted, and which is sealed by said finger element alignment means.

23. The apparatus of claim 14, said vacuum means further comprising a suction passageway and a gate member disposed within said suction passageway, wherein said gate member controls suction within said suction chamber.

24. A method of loading a thin-walled, elastic, tubular member having one closed end and one open end onto a set of plural, radially expandable, finger elements, the method comprising the steps of:
   providing vacuum means adapted to produce a suction sufficient to draw a tubular member, a suction chamber, plural, radially expandable, rod-like finger elements, and separable finger element alignment means;
   inserting said finger elements through said finger element alignment means and into said suction chamber such that said finger elements are retained and aligned by said finger element alignment means;
   activating said vacuum means to produce a suction within said suction chamber such that a tubular member is drawn into said suction chamber and onto said finger elements;
   deactivating said vacuum means and separating said finger element alignment means; and
   removing said finger elements with the tubular member disposed thereon from said suction chamber.

25. The method of claim 24, further comprising the step of advancing together said finger element alignment means after said finger elements are inserted through said finger element alignment means.

* * * * *